(12) United States Patent
Nogawa

(10) Patent No.: US 9,567,945 B2
(45) Date of Patent: Feb. 14, 2017

(54) EXHAUST CIRCULATION APPARATUS FOR INTERNAL COMBUSTION ENGINE

(75) Inventor: Shinichiro Nogawa, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/364,534

(22) PCT Filed: Jan. 24, 2012

(86) PCT No.: PCT/JP2012/051466
§ 371 (c)(1),
(2), (4) Date: Jun. 11, 2014

(87) PCT Pub. No.: WO2013/111273
PCT Pub. Date: Aug. 1, 2013

(65) Prior Publication Data
US 2014/0352298 A1 Dec. 4, 2014

(51) Int. Cl.
*F02D 23/00* (2006.01)
*F02M 25/07* (2006.01)
(Continued)

(52) U.S. Cl.
CPC .......... *F02M 25/0704* (2013.01); *F02D 21/08* (2013.01); *F02D 41/005* (2013.01);
(Continued)

(58) Field of Classification Search
CPC ............ F02M 25/0705; F02M 25/0707; F02M 25/0709; F02M 25/074; F02M 25/0749; F02M 26/08; F02M 2026/004
(Continued)

(56) References Cited

U.S. PATENT DOCUMENTS 6,058,906 A * 5/2000 Yoshino .................. F02D 33/00
123/295
7,290,528 B2 * 11/2007 Minegishi ........... F02D 41/0072
123/399
(Continued)

FOREIGN PATENT DOCUMENTS

EP 0928369 A1 7/1999
EP 1688601 A2 8/2006
(Continued)

*Primary Examiner* — Nicholas J Weiss
*Assistant Examiner* — Jason T Newton
(74) *Attorney, Agent, or Firm* — Sughrue Mion, PLLC

(57) ABSTRACT

An exhaust circulation apparatus that can improve fuel combustion and suppress discharged NOx by expanding an operating region in which homogeneous lean combustion is possible. The exhaust circulation apparatus includes a homogeneous lean combustion unit for performing homogeneous lean combustion in a predetermined lean-burn region, and an EGR apparatus for performing EGR that recirculates a portion of gas that flows through an exhaust system of the internal combustion engine to an intake system. When performing homogeneous lean combustion, the exhaust circulation apparatus controls the EGR apparatus to perform EGR. An LPL-EGR apparatus that recirculates gas flowing through an exhaust passage on a downstream side of a turbine to an intake passage on an upstream side of a compressor is used as the EGR apparatus. Preferably, an air-fuel ratio is controlled so as to be 22:1 and an EGR rate is controlled so as to be between 10% and 20%.

8 Claims, 10 Drawing Sheets

(51) Int. Cl.
 *F02D 21/08* (2006.01)
 *F02D 41/14* (2006.01)
 *F02D 41/00* (2006.01)

(52) U.S. Cl.
 CPC ......... *F02D 41/1475* (2013.01); *F02M 26/05* (2016.02); *F02M 26/06* (2016.02); *F02M 26/35* (2016.02); *F02M 26/43* (2016.02); *F02D 41/0057* (2013.01); *F02D 41/0065* (2013.01); *F02M 26/15* (2016.02); *Y02T 10/47* (2013.01)

(58) Field of Classification Search
 USPC ................................ 60/605.2, 612; 701/108
 See application file for complete search history.

(56) References Cited

U.S. PATENT DOCUMENTS

| | | | | |
|---|---|---|---|---|
| 7,398,762 | B2* | 7/2008 | Russell | F02D 13/02 123/434 |
| 7,512,479 | B1* | 3/2009 | Wang | F02D 41/0002 123/568.21 |
| 2004/0149274 | A1* | 8/2004 | Kurtz | F02D 41/0275 123/672 |
| 2006/0243241 | A1* | 11/2006 | Kuo | F01L 13/00 123/295 |
| 2008/0314036 | A1 | 12/2008 | Yokoyama et al. | |
| 2011/0146637 | A1* | 6/2011 | Kang | F02D 21/08 123/568.19 |
| 2011/0288750 | A1 | 11/2011 | Wermuth et al. | |
| 2014/0000553 | A1* | 1/2014 | Dieler | F02D 41/3041 123/295 |
| 2014/0039776 | A1* | 2/2014 | Cowgill | F02D 41/006 701/102 |
| 2015/0184582 | A1* | 7/2015 | Kondo | F02D 41/1456 123/674 |

FOREIGN PATENT DOCUMENTS

| | | | |
|---|---|---|---|
| EP | 2395218 A1 | | 12/2011 |
| JP | 05-296111 A | | 11/1993 |
| JP | 05-302548 A | | 11/1993 |
| JP | 08246963 A | * | 9/1996 |
| JP | 11-117785 A | | 4/1999 |
| JP | 11-324817 A | | 11/1999 |
| JP | 2002188522 A | * | 7/2002 |
| JP | 2003-129874 A | | 5/2003 |
| JP | 2005-214063 A | | 8/2005 |
| JP | 2008-267247 A | | 11/2008 |
| JP | 2009-2190 A | | 1/2009 |
| JP | 2010-190150 A | | 9/2010 |
| JP | 2011-241746 A | | 12/2011 |

* cited by examiner

EXHAUST CIRCULATION APPARATUS FOR INTERNAL COMBUSTION ENGINE

CROSS REFERENCE TO RELATED APPLICATIONS

This application is a National Stage of International Application No. PCT/JP2012/051466, filed Jan. 24, 2012, the contents of all of which are incorporated herein by reference in their entirety.

TECHNICAL FIELD

The present invention relates to an exhaust circulation apparatus for an internal combustion engine that is capable of executing EGR (exhaust gas recirculation) that recirculates a portion of exhaust gas to an intake system.

BACKGROUND ART

An exhaust circulation apparatus for an engine with a supercharger that performs EGR that recirculates a portion of exhaust gas to an intake system is already known, as disclosed, for example, in Japanese Patent Laid-Open No. 2003-129874. According to this apparatus, EGR is performed when performing stratified lean combustion in which a gaseous mixture of fuel and air is stratified and a comparatively dense gaseous mixture in the vicinity of a spark plug is ignited, and a flame is propagated to a lean gaseous mixture inside the combustion chambers by a fire source that was ignited. Since it is thereby possible to reduce the combustion temperature, the amount of discharged NOx is suppressed.

CITATION LIST

Patent Literature

Patent Literature 1: Japanese Patent Laid-Open No. 2003-129874
Patent Literature 2: Japanese Patent Laid-Open No. 2005-214063

SUMMARY OF INVENTION

Technical Problem

However, there is a limit to the degree to which the amount of discharged NOx can be suppressed by stratified lean combustion. FIG. 16 is a view which compares changes in the amount of discharged NOx relative to an air-fuel ratio (A/F) by combustion form. As shown in FIG. 16, with stratified combustion, although the amount of discharged NOx decreases as the air-fuel ratio becomes leaner in a lean-burn region, the extent of the decrease is not particularly large. This is because, with stratified combustion, the temperature around a spark plug is always high, even when performing lean-burn operation. Consequently, although EGR is generally performed with stratified lean combustion, a certain amount of NOx discharge is nevertheless unavoidable.

Therefore, one technology that has been the focus of attention in recent years is homogeneous combustion that causes a gaseous mixture of fuel and air to combust after being evenly mixed inside a cylinder. As shown in FIG. 16, according to homogeneous combustion it is possible to suppress a NOx discharge amount in a lean-burn region compared to the case of stratified combustion. This is because, in a lean-burn region, the overall temperature in a combustion chamber decreases as the air-fuel ratio becomes leaner. However, a problem with homogeneous lean combustion concerns the narrowness of the operating region thereof. That is, in the case of homogeneous lean combustion, the exhaust gas temperature decreases since combustion is performed with a large quantity of fresh air. Accordingly, because the bed temperature of an exhaust emission purifying catalyst decreases at a time of light-load operation, homogeneous lean combustion cannot be performed. Further, the efficiency decreases at a time of high-load operation due to the occurrence of knocking. Thus, in a conventional engine that performs homogeneous combustion, there is no other choice than to perform stoichiometric combustion in an operating region in which homogeneous lean combustion cannot be executed, and there has thus been a desire for further improvement from the viewpoint of improving fuel consumption and suppressing the amount of NOx discharge.

The present invention has been conceived to solve the above described problem, and an object of the present invention is to provide an exhaust circulation apparatus for an internal combustion engine that, in an internal combustion engine that performs homogeneous combustion, can improve fuel consumption and suppress the amount of discharged NOx by expanding an operating region in which homogeneous lean combustion is possible.

Means for Solving the Problems

In accomplishing the above object, according to a first aspect of the present invention, there is provided an exhaust circulation apparatus for an internal combustion engine, comprising:

homogeneous lean combustion means for performing homogeneous lean combustion in a predetermined lean-burn region;

an EGR apparatus for performing EGR that recirculates a portion of gas that flows through an exhaust system of the internal combustion engine to an intake system; and control means for controlling the EGR apparatus based on an operating condition of the internal combustion engine, wherein, when performing the homogeneous lean combustion, the control means controls the EGR apparatus to perform EGR.

According to a second aspect of the present invention, there is provided the exhaust circulation apparatus for an internal combustion engine as described in the first aspect, wherein the internal combustion engine comprises a turbo-supercharger having a turbine that is disposed in an exhaust passage and a compressor that is disposed in an intake passage;

the EGR apparatus includes a low-pressure loop EGR apparatus that recirculates gas that flows through the exhaust passage on a downstream side of the turbine to the intake passage at a position on an upstream side of the compressor; and when performing the homogeneous lean combustion, the control means controls the low-pressure loop EGR apparatus to perform EGR.

According to a third aspect of the present invention, there is provided the exhaust circulation apparatus for an internal combustion engine as described in the first or second aspects, wherein the EGR apparatus comprises means for adjusting an EGR rate that represents a ratio of a gas amount that is recirculated by EGR with respect to a total gas amount that is taken into the internal combustion engine;

the homogeneous lean combustion means performs homogeneous lean combustion so that an air-fuel ratio that represents a ratio of a fresh air amount that is taken in with respect to an in-cylinder fuel amount of the internal combustion engine is 22:1; and the control means controls the EGR apparatus so that the EGR rate during the homogeneous lean combustion is between 10% and 20%.

According to a fourth aspect of the present invention, there is provided the exhaust circulation apparatus for an internal combustion engine as described in the second or third aspects, further comprising stoichiometric combustion means for performing stoichiometric combustion in which a combustion air-fuel ratio of the internal combustion engine is a theoretical air-fuel ratio in a stoichiometric burn region that is a region on a high-load side relative to the lean-burn region, wherein the EGR apparatus further includes a high-pressure loop EGR apparatus that recirculates gas that flows through the exhaust passage on an upstream side of the turbine to the intake passage at a position on a downstream side of the compressor; and when performing the stoichiometric combustion, the control means controls both of the high-pressure loop EGR apparatus and the low-pressure loop EGR apparatus to perform EGR.

According to a fifth aspect of the present invention, there is provided the exhaust circulation apparatus for an internal combustion engine as described in the fourth aspect, wherein the EGR apparatus includes means for adjusting an EGR rate that represents a ratio of a gas amount that is recirculated by EGR with respect to a total gas amount that is taken into the internal combustion engine; and when performing the stoichiometric combustion, the control means controls the low-pressure loop EGR apparatus and the high-pressure loop EGR apparatus so that an EGR rate generated by the low-pressure loop EGR apparatus is 15% and an EGR rate generated by the high-pressure loop EGR apparatus is 10%.

Advantageous Effects of Invention

According to the first invention, since EGR is performed during homogeneous lean combustion, knocking on a high-load side that is a problem at a time of homogeneous lean combustion can be effectively suppressed. Further, CO and HC included in EGR gas contribute to an oxidation reaction in the catalyst. Consequently, it is possible to effectively suppress a decrease in the bed temperature of the catalyst on a low-load side that is a problem at a time of homogeneous lean combustion. Therefore, according to the present invention, it is possible to effectively expand a lean-burn region in which homogeneous lean combustion is possible, and thereby improve fuel consumption.

According to the second invention, EGR is executed by a low-pressure loop EGR apparatus during homogeneous lean combustion. The EGR executed by the low-pressure loop EGR apparatus is stable with respect to the rotational load of the internal combustion engine. Therefore, according to the present invention, since stable EGR can be realized at a time of a transient operation of the internal combustion engine also, misfiring and the like can be prevented.

According to the third invention, when performing EGR during homogeneous lean combustion, the air-fuel ratio is controlled to 22:1 and the EGR rate is controlled to between 10% and 20%. Although the fuel consumption decreases as the EGR rate increases, the operating region in which homogeneous lean combustion can be executed expands. Therefore, according to the present invention, the fuel consumption is improved to the maximum by controlling the air-fuel ratio to be a value of 22:1 and controlling the EGR rate to be a value between 10% and 20% during homogeneous lean combustion.

According to the fourth invention, when performing stoichiometric combustion in a stoichiometric burn region that is on a high-load side relative to a lean-burn region, EGR is performed using both of a low-pressure loop EGR apparatus and a high-pressure loop EGR apparatus. In each of these EGR apparatuses, there is a limit to an EGR amount that can be introduced while avoiding the occurrence of misfiring. According to the present invention, since a large amount of EGR gas can be introduced during stoichiometric combustion under a high load by using these EGR apparatuses in combination, the amount of NOx that is discharged can be suppressed while securing the torque at the time of a high load.

According to the fifth invention, when performing an EGR operation during stoichiometric combustion, the EGR rate of the low-pressure loop EGR apparatus is controlled to 15% and the EGR rate of the high-pressure loop EGR apparatus is controlled to 10%. If the EGR rate exceeds 25%, the turbulent burning velocity becomes 0 and the propagation of a flame no longer occurs. If an EGR rate of 25% is realized with only one of the EGR apparatuses, a deceleration misfire at a time of transition as well as a deterioration in responsiveness and the like become a problem. Therefore, according to the present invention, by realizing an EGR rate of 25% by combined use of a high-pressure loop EGR apparatus and a low-pressure loop EGR apparatus during stoichiometric combustion, a discharge amount of NOx can be suppressed to a maximum while suppressing the occurrence of a deceleration misfire at a time of transition as well as a deterioration in responsiveness.

MODE FOR CARRYING OUT THE INVENTION

Hereunder, embodiments of the present invention are described based on the attached drawings. Note that elements that are common to the respective drawings are denoted by the same reference symbols, and a duplicate description thereof is omitted. Further, the present invention is not limited by the following embodiments.

Embodiment 1

[Configuration of Embodiment 1]

Figure 1:
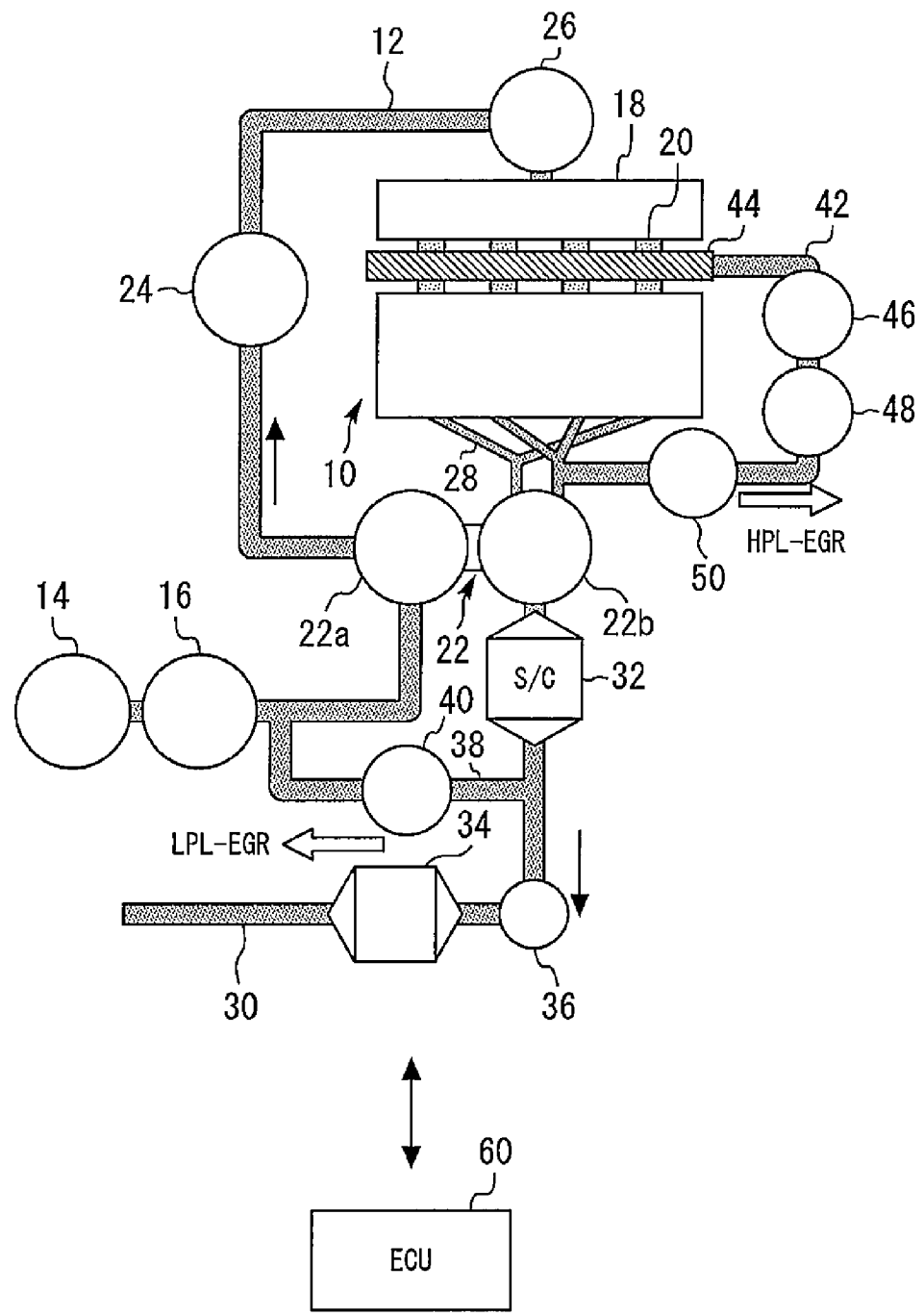
FIG. 1 is a view illustrating a schematic configuration of a system in which an internal combustion engine to which a control apparatus is applied as Embodiment 1 of the present invention is mounted.

FIG. 1 is a view illustrating a schematic configuration of a system in which an internal combustion engine (hereunder, referred to as simply "engine") to which a control apparatus is applied as Embodiment 1 of the present invention is mounted. An engine 10 shown in FIG. 1 is a spark ignition four-stroke reciprocating engine, and is configured to be capable of lean burn operation using homogeneous combustion. The engine 10 has a configuration that includes an intake system for supplying air into a combustion chamber of each cylinder, an exhaust system for discharging exhaust gas, an EGR system for recirculating a part of the exhaust gas of the exhaust system to the intake system, and a control system for controlling operations of the engine 10. Hereunder, the configuration of each of these systems is described in detail.

The intake system of the engine 10 includes an intake passage 12. An air cleaner 14 is installed on the entrance side of the intake passage 12. An air flow meter 16 that outputs a signal that is in accordance with a flow rate of air that is drawn into the intake passage 12 is installed on a downstream side of the air cleaner 14 in the intake passage 12. An outlet side of the intake passage 12 is connected to a combustion chamber of each cylinder through a surge tank 18 and an intake manifold 20.

A compressor 22a of a turbo-supercharger 22 is arranged on a downstream side of the air flow meter 16 in the intake passage 12. An intercooler 24 for cooling intake air that was compressed by the compressor 22a is arranged in the intake passage 12 on a downstream side of the compressor 22a. A throttle valve 26 for adjusting the amount of air that is supplied into the engine 10 is arranged in the intake passage on a downstream side of the intercooler 24.

The exhaust system of the engine 10 includes an exhaust passage 30. One end side of the exhaust passage 30 is connected to the combustion chamber of each cylinder through the exhaust manifold 28. A turbine 22b of the turbo-supercharger 22 is arranged partway along the exhaust passage 30. A start catalyst (hereunder referred to as "S/C") 32 and a lean NOx catalyst 34 are arranged in that order in the exhaust passage 30 on the downstream side of the turbine 22b. The S/C 32 is a so-called three-way catalyst, and efficiently purifies the three components HC, CO, and NOx that are included in exhaust gas in the vicinity of the theoretical air-fuel ratio. On the other hand, the lean NOx catalyst 34 is a so-called storage-reduction type NOx catalyst, and has a storing/releasing action whereby the lean NOx catalyst 34 stores NOx when the air-fuel ratio of exhaust gas is in a predetermined lean region and releases NOx when the air-fuel ratio is in a rich region. A NOx sensor 36 for detecting a NOx concentration in exhaust gas is arranged in the exhaust passage 30 between the S/C 32 and the lean NOx catalyst 34.

The EGR system of the engine 10 includes a low-pressure loop EGR passage (LPL-EGR passage) 38. One end of the LPL-EGR passage 38 is connected to the exhaust passage 30 between the S/C 32 and the lean NOx catalyst 34, and the other end is connected to the intake passage 12 between the air flow meter 16 and the compressor 22a. An LPL-EGR valve 40 for opening and closing the passage 38 is provided partway along the LPL-EGR passage 38.

The EGR system of the engine 10 also includes a high-pressure loop EGR passage (HPL-EGR passage) 42. One end of the HPL-EGR passage 42 is connected to the exhaust passage 30 on the upstream side of the turbine 22b, and the other end is connected to the intake manifold 20 through an EGR delivery 44. A HPL-EGR valve 46 for opening and closing the passage 42, an EGR cooler 48 for cooling EGR gas, and an EGR catalyst 50 for purifying unburned HC or particulate matter contained in the EGR gas are provided in that order from the EGR delivery 44 partway along the HPL-EGR passage 42.

The engine 10 of the present embodiment includes an ECU (electronic control unit) 60 as the control system thereof. The aforementioned LPL-EGR valve 40, HPL-EGR valve 46, and throttle valve 26 as well as various actuators such as a spark plug (not illustrated in the drawings) are connected to an output side of the ECU 60. In addition to the aforementioned air flow meter 16 and NOx sensor 36, various sensors such as a crank angle sensor (not illustrated in the drawings) that outputs a signal in accordance with a rotational angle of a crankshaft (not illustrated in the drawings), and an air-fuel ratio sensor (not illustrated in the drawings) are connected to an input side of the ECU 60. The ECU 60 is configured to cause the various actuators included in the engine to operate in accordance with a predetermined control program based on the outputs of the respective sensors that the engine includes.

[Operations of Embodiment 1]

Figure 16:
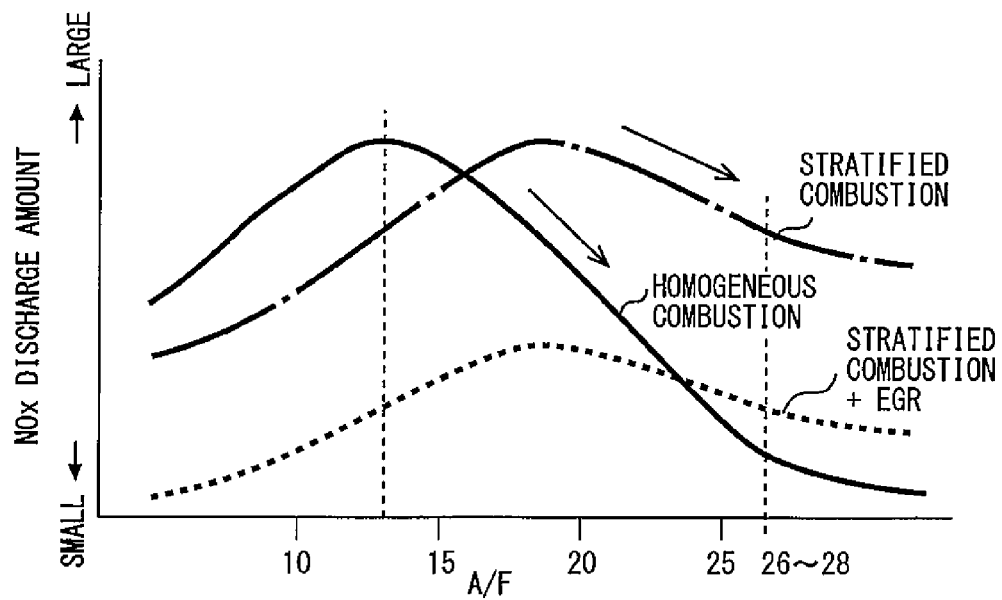
FIG. 16 is a view which compares changes in the amount of discharged NOx relative to an air-fuel ratio A/F by combustion form.

Next, operations of the system of Embodiment 1 will be described with reference to the drawings. As described above, the engine 10 of the present embodiment is configured so as to enable lean burn operation using homogeneous combustion. Therefore, for instance, in the example illustrated in FIG. 16, by performing homogeneous lean combustion in which the air-fuel ratio A/F is made a ratio between 26:1 and 28:1, a NOx discharge amount can be suppressed more than in the case of stratified lean combustion accompanied by EGR.

However, as described above, a problem with homogeneous lean combustion is the narrowness of the operating region thereof. That is, although homogeneous lean combustion can suppress a NOx discharge amount, there is a concern that the temperature of exhaust gas will decrease more than necessary in a light-load operating region. In such an operating region, since a decrease in the NOx purification performance that is caused by a drop in the bed temperature of the S/C 32 is a problem, it is required to perform a stoichiometric burn operation. Further, since the resistance of homogeneous lean combustion to knocking is low, it is required to perform stoichiometric burn operation when operating in a high-load operating region. Thus, in an engine that performs homogeneous combustion, the degree to which the lean burn operating region can be expanded significantly influences the extent to which fuel consumption is improved and a NOx discharge amount is suppressed.

Figure 2:
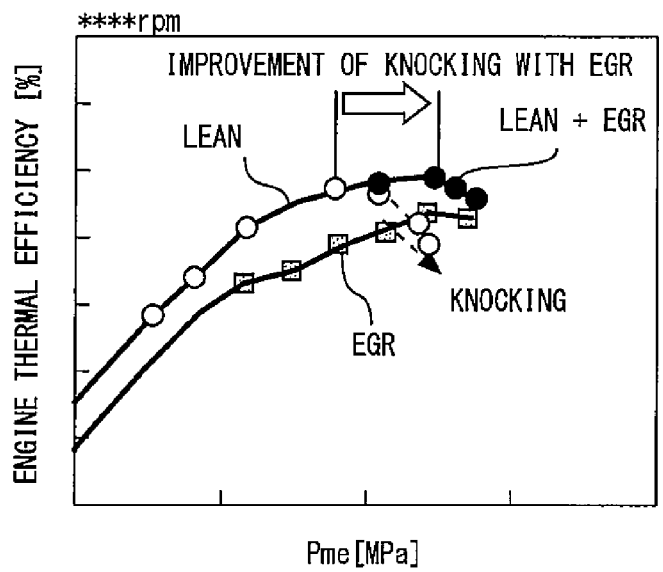
FIG. 2 is a view that illustrates the engine thermal efficiency with respect to the intake pressure.

Therefore, according to the system of the present embodiment, EGR is performed at a time of homogeneous lean combustion of the engine 10. FIG. 2 is a view that illustrates the engine thermal efficiency with respect to the intake pressure. As illustrated in FIG. 2, it is found that when EGR is performed during homogeneous lean combustion, the engine thermal efficiency in a high-load operating region increases in comparison to when EGR is not performed. This is because $CO_2$ in the EGR gas acts as an inactive gas, and generation of knocking is suppressed in the high-load operating region.

Figure 3:
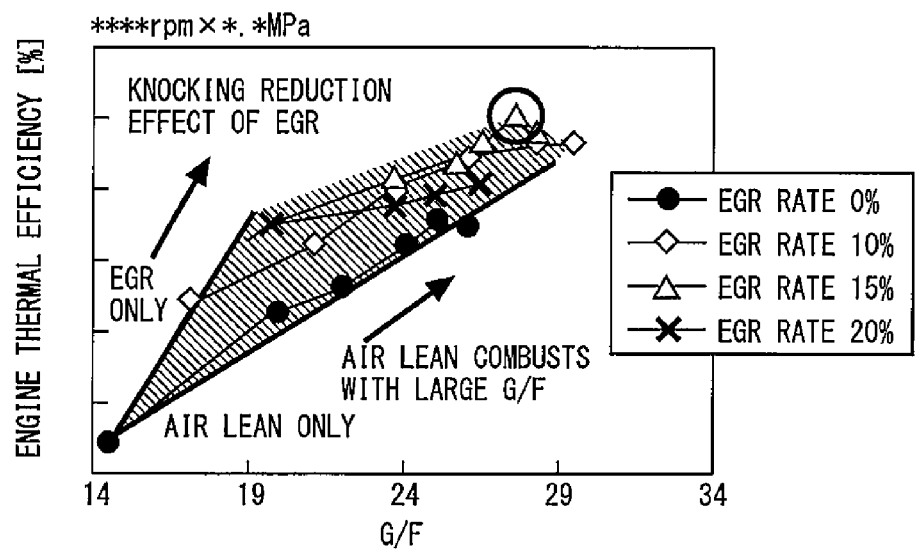
FIG. 3 is a view that illustrates the engine thermal efficiency with respect to a gas-fuel ratio G/F for respective EGR rates.

FIG. 3 is a view that illustrates the engine thermal efficiency with respect to a gas-fuel ratio G/F for respective EGR rates. Note that the gas-fuel ratio G/F can be expressed by the following equation (1).

$$G/F = (Ga + Gegr)/Gf \qquad (1)$$
$$= A/F \times (1/(1 - EGR/100))$$

In the above equation (1), A/F represents an air-fuel ratio, that is, a ratio between fresh air and a fuel amount, and EGR represents an EGR rate [%]. Further, Ga represents a fresh air amount [g/s], Gegr represents an EGR gas amount [g/s], and Gf represents a fuel consumption amount [g/s].

As shown in FIG. 3, it is found that the engine thermal efficiency is higher in a case where EGR is performed than in a case where EGR is not performed (case where the EGR rate is 0%). In particular, it is found that in a lean-burn region in which the G/F is between 26:1 and 28:1, the engine thermal efficiency reaches a highest value when the EGR rate is 15%. Thus, according to the system of the present embodiment, by performing EGR during homogeneous combustion, it is possible to effectively expand the lean-burn region to the high-load side.

Figure 4:
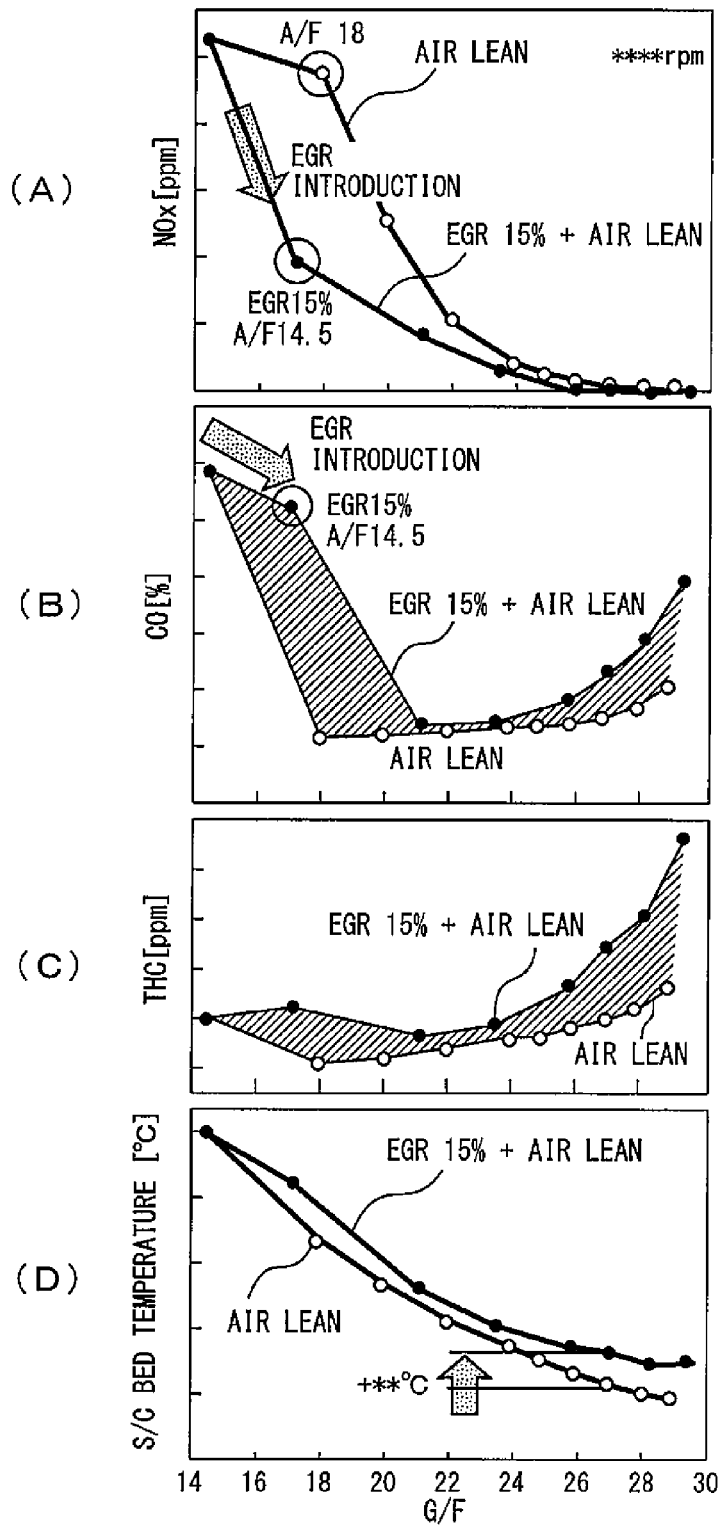
FIG. 4 is a multiple view drawing illustrating (A) a NOx discharge amount, (B) a CO discharge amount, (C) a THC discharge amount, and (D) an S/C bed temperature with respect to a gas-fuel ratio G/F, respectively.

FIG. 4 is a multiple view drawing illustrating (A) a NOx discharge amount, (B) a CO discharge amount, (C) a THC discharge amount, and (D) an S/C bed temperature with respect to a gas-fuel ratio GIF, respectively. As shown in (A) to (C) in FIG. 4, when NOx discharge amounts at an equal GIF during homogeneous combustion are compared, it is found that in comparison to when EGR is not performed, the NOx discharge amount is less when EGR is performed and, conversely, the discharge amounts of CO and HC increase. CO and HC are supplied to an oxidation reaction inside the S/C 32. Consequently, as shown in (D) in FIG. 4, when EGR is performed during homogeneous combustion, it is possible to effectively suppress a decrease in the bed temperature of the S/C 32 in a lean burn operating region.

Figure 5:
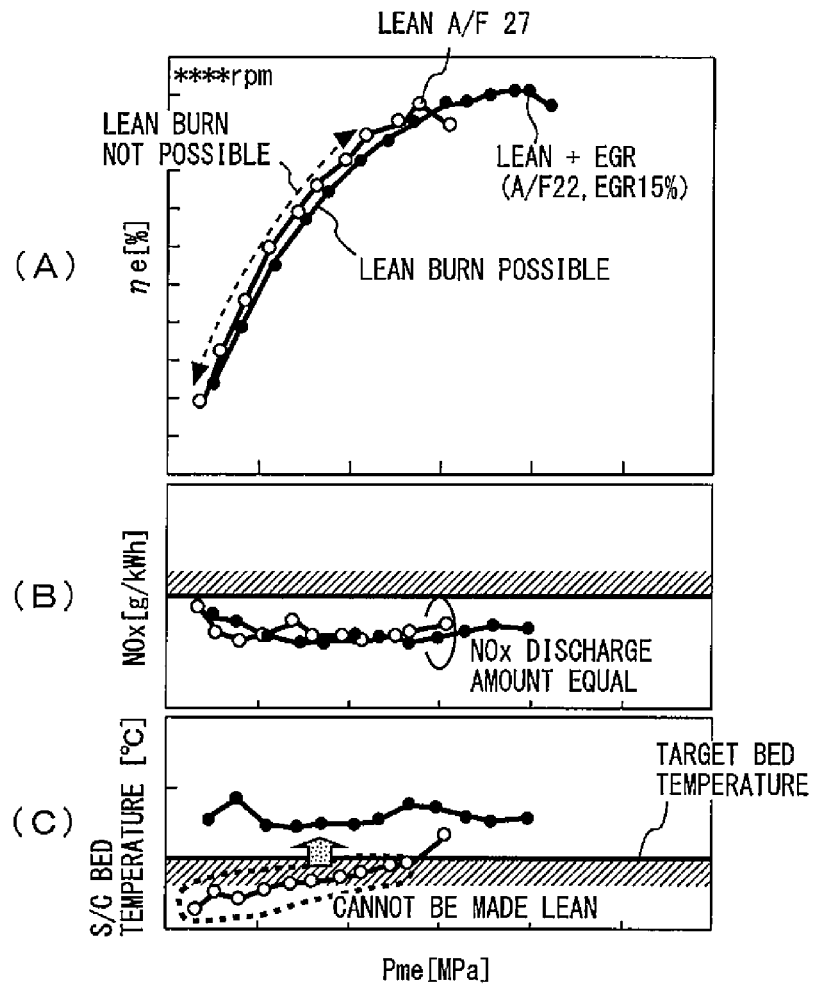
FIG. 5 is a multiple view drawing illustrating (A) heat efficiency, (B) a NOx discharge amount, and (C) changes in an S/C temperature rise with respect to an intake pressure, respectively, for cases in which EGR is performed and not performed, respectively, during homogeneous lean combustion.

FIG. 5 is a multiple view drawing illustrating (A) heat efficiency, (B) a NOx discharge amount, and (C) changes in an S/C temperature rise with respect to an intake pressure, respectively, for cases in which EGR is performed and not performed, respectively, during homogeneous lean combustion. As shown in (C) in FIG. 4, in a case where EGR is not performed during homogeneous lean combustion, in a light-load region, lean burn operation cannot be performed because the bed temperature of the S/C 32 does not reach a predetermined target bed temperature. In this respect, when EGR is performed during homogeneous lean combustion, since the bed temperature of the S/C 32 can be effectively increased in a light-load region, it is possible to effectively expand a region in which a lean burn operation is possible to the low-load side.

Figure 6:
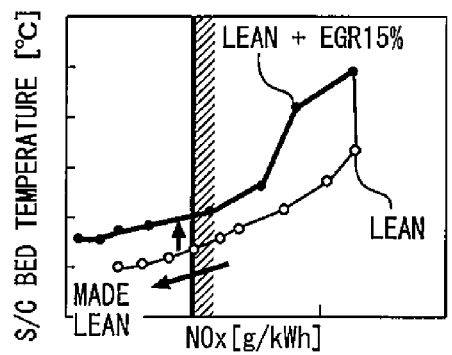
FIG. 6 is a view illustrating S/C bed temperatures with respect to NOx discharge amounts for a case in which EGR is performed and a case in which EGR is not performed, respectively, during homogeneous lean combustion.

FIG. 6 is a view illustrating S/C bed temperatures with respect to NOx discharge amounts for a case in which EGR is performed and a case in which EGR is not performed, respectively, during homogeneous lean combustion. As illustrated in FIG. 6, it is found that when EGR is performed during homogeneous lean combustion, the efficiency of the bed temperature of the S/C 32 with respect to the discharged amount of NOx is favorable. Accordingly, performing EGR during homogeneous lean combustion makes it possible to attain a high degree of compatibility between suppressing the amount of discharged NOx and improving the fuel consumption by expanding the lean burn operating region.

Figure 7:
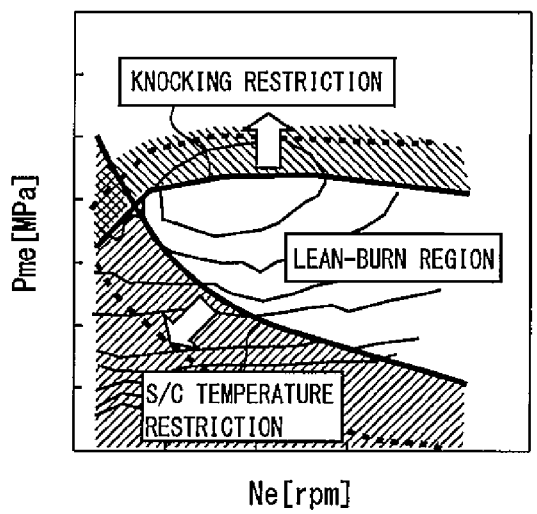
FIG. 7 is a view illustrating a lean burn operating region during homogeneous combustion.

As described above, when EGR is performed during homogeneous lean combustion, an operating region in which a lean burn operation is possible can be effectively expanded. FIG. 7 is a view illustrating a lean burn operating region during homogeneous combustion. As shown in FIG. 7, when EGR is performed during homogeneous combustion, the lean burn operation can be expanded to the high-load side and the low-load side. Thus, when performing homogeneous lean combustion, it is possible to attain a high degree of compatibility between suppressing the amount of discharged NOx and improving the fuel consumption by expanding the lean burn operating region.

The inventors of the present application conducted extensive studies regarding air-fuel ratios and EGR rates during homogeneous lean combustion, and as a result discovered a combination of an air-fuel ratio and an EGR rate that is favorable from the viewpoint of suppressing the amount of discharged NOx and improving fuel consumption. Specifically, the inventors of the present application found that fuel consumption reaches a maximum while suppressing the amount of discharged NOx when the EGR rate is between 10% and 20% (preferably 15%) and the A/F is 22:1. Hereunder, the basis for this finding is described from the viewpoint of the S/C bed temperature and the viewpoint of knocking, respectively.

Figure 8:
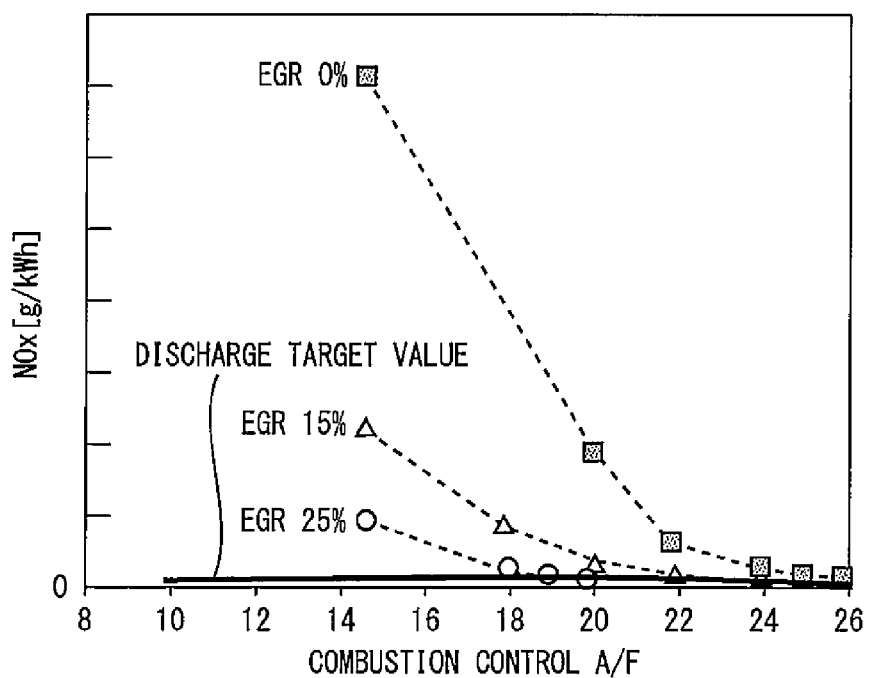
FIG. 8 is a view that illustrates the relation between a NOx discharge amount and the A/F at respective EGR rates.

First, the effect on fuel consumption when EGR is performed during homogeneous lean combustion is considered from the viewpoint of the S/C bed temperature. FIG. 8 is a view that illustrates the relation between a NOx discharge amount and the A/F at respective EGR rates. As shown in FIG. 8, the A/F for satisfying a target value (for example, 1 g/kWh) with respect to the NOx discharge amount varies according to the EGR rate.

Figure 9:
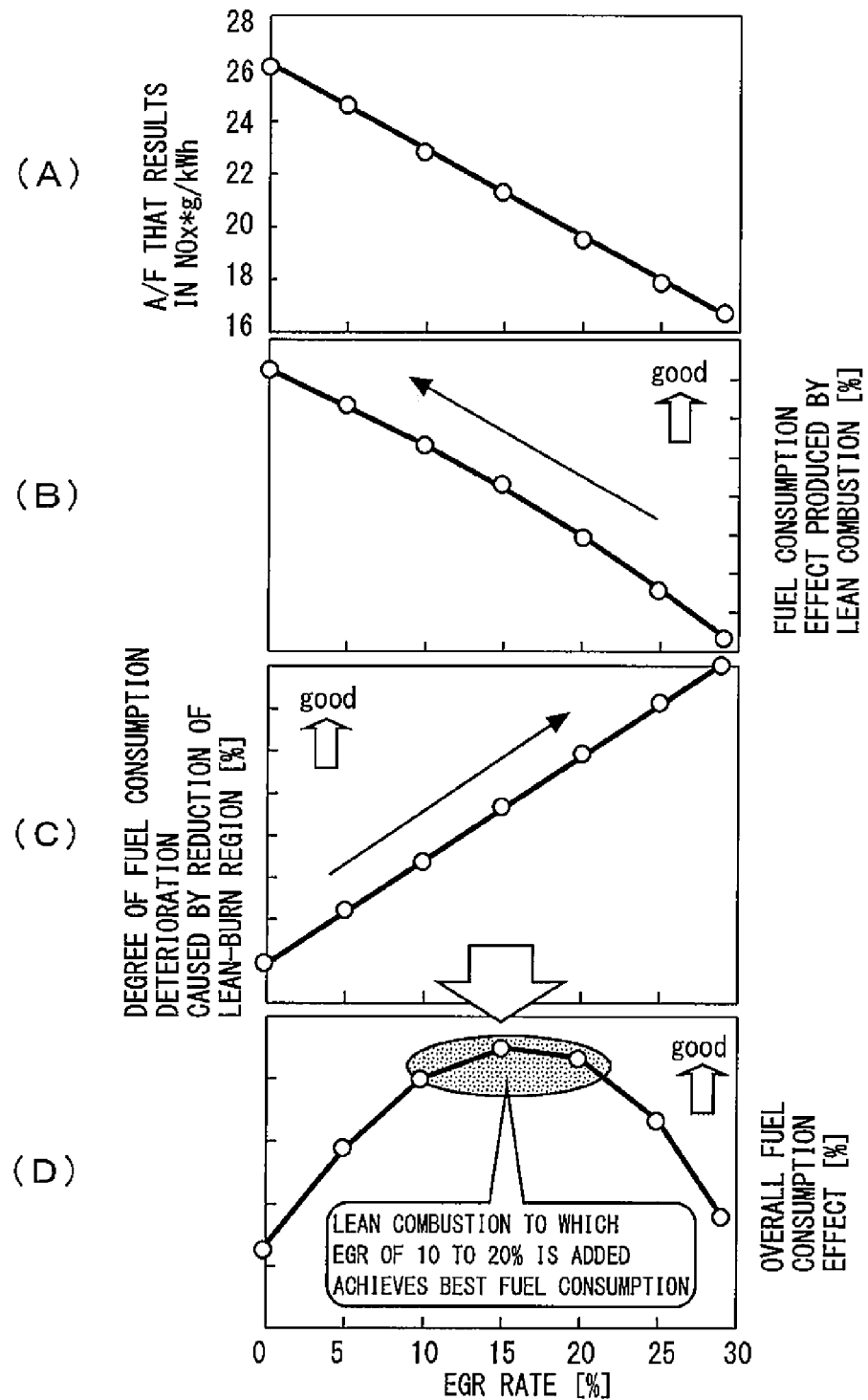
FIG. 9 is a multiple view drawing illustrating, with respect to an EGR rate, (A) an A/F at which a NOx discharge amount becomes a predetermined target amount, (B) the effect on fuel consumption produced by lean combustion, (C) the degree of deterioration in fuel consumption resulting from a decrease in the region of lean burn operation, and (D) an overall fuel consumption effect, respectively.

FIG. 9 is a multiple view drawing illustrating, with respect to an EGR rate, (A) an A/F at which a NOx discharge amount becomes a predetermined target amount, (B) the effect on fuel consumption produced by lean combustion, (C) the degree of deterioration in fuel consumption resulting from a decrease in the region of lean burn operation, and (D) an overall fuel consumption effect, respectively. First, the relation shown in (A) in FIG. 9 is a relation that is derived from the relation shown in the above described FIG. 8. As shown in (A) in FIG. 9, an A/F in a case where the NOx discharge amount satisfies a target amount is an air-fuel ratio that moves to the rich side as the EGR rate increases. In this case, as shown in (B) in FIG. 9, the effect on fuel consumption that is produced by lean combustion in a case where the NOx discharge amount satisfies a target amount increases as the EGR rate decreases. This is because better fuel consumption is obtained in the case of normal lean combustion than in the case of combustion accompanied by EGR gas. Therefore, from the viewpoint of engine combustion, a low EGR rate is preferable in terms of improving the fuel consumption.

On the other hand, as shown in (C) in FIG. 9, in a case where the NOx discharge amount satisfies a target amount, the degree of deterioration in the fuel consumption that results from a decrease in the region of lean burn operation changes in the direction of improvement as the EGR rate increases. This is because, the higher that the EGR rate is, the greater the degree to which a decrease in the bed temperature of the S/C 32 can be suppressed, and hence an operating region on the light-load side of the lean burn operation can be expanded. Therefore, from the viewpoint of the limitation of the operating region on the light-load side, increasing the EGR rate is preferable with regard to improving the fuel consumption.

In FIG. 9, (D) is a view that takes into account the overall influences on fuel consumption shown in (B) and (C) in the drawing. As shown in (D) in FIG. 9, it is found that the effect on fuel consumption is high when the EGR rate is between 10% and 20% (particularly, 15%) and the A/F is around 22:1.

Figure 10:
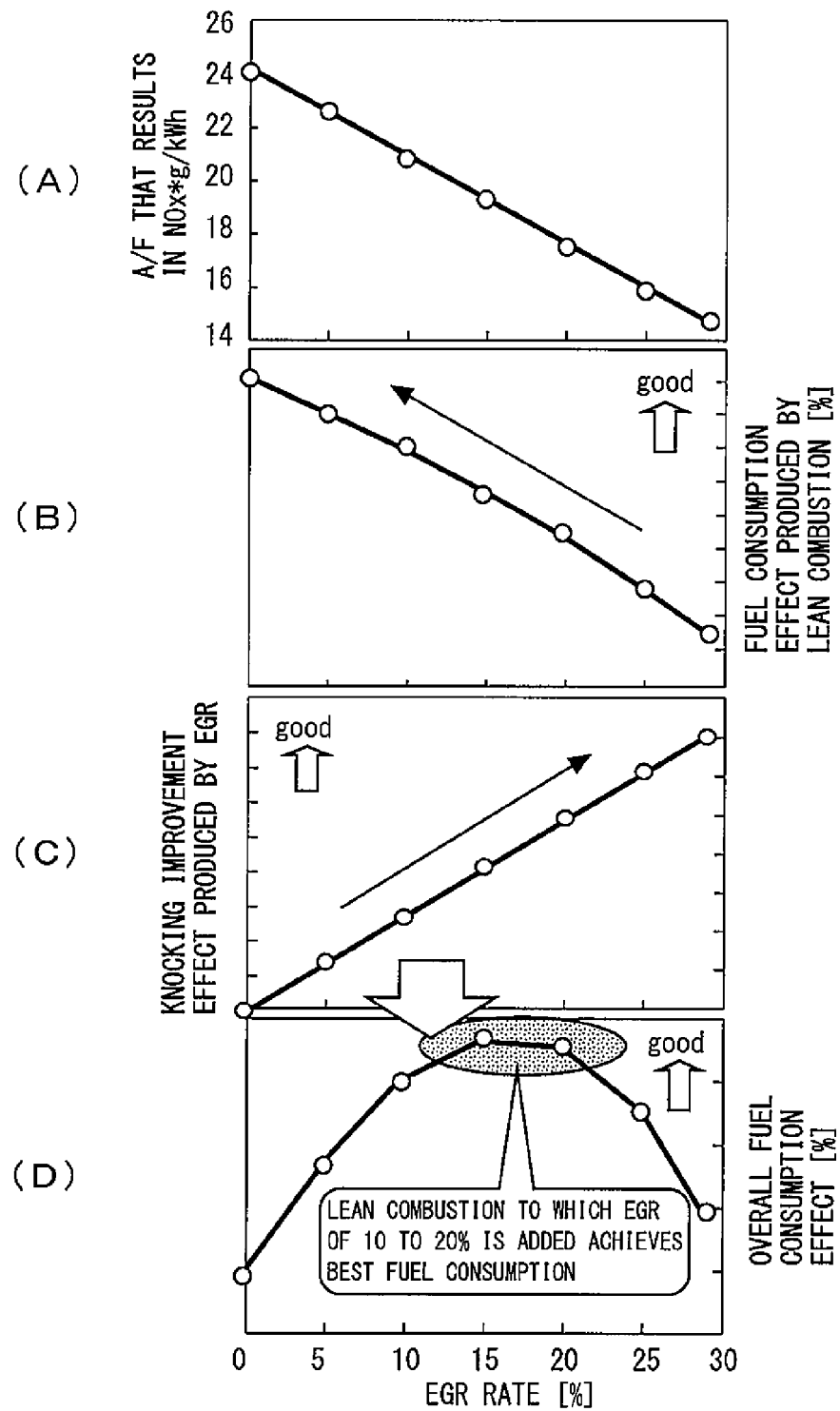
FIG. 10 is a multiple view drawing illustrating, with respect to the EGR rate, (A) an A/F at which a NOx discharge amount becomes a predetermined target amount, (B) the effect on fuel consumption produced by lean combustion, (C) the effect on fuel consumption produced by improvement of knocking, and (D) an overall fuel consumption effect, respectively.

Next, the effect on fuel consumption when EGR is performed during homogeneous lean combustion will be considered from the viewpoint of knocking. FIG. 10 is a multiple view drawing illustrating, with respect to the EGR rate, (A) an A/F at which a NOx discharge amount becomes a predetermined target amount, (B) the effect on fuel consumption produced by lean combustion, (C) the effect on fuel consumption produced by improvement of knocking, and (D) an overall fuel consumption effect, respectively.

The relations shown in (A) and (B) in FIG. 10 are the same as the relations shown in (A) and (B) in FIG. 9. As shown in (C) in FIG. 10, the effect on fuel consumption produced by improvement of knocking in a case where the NOx discharge amount satisfies the target amount changes in the direction of fuel consumption improvement as the EGR rate increases. This is because the proportion of $CO_2$ inside the combustion chambers increases relatively as the EGR rate increases, and resistance to knocking increases. Therefore, from the viewpoint of knocking, increasing the EGR rate is preferable with regard to improving the fuel consumption.

In FIG. 10, (D) is a view that takes into account the overall influences on fuel consumption shown in (B) and (C) in the drawing. As shown in (D) in FIG. 10, it is found that a fuel consumption effect is high when the EGR rate is between 10% and 20% (particularly, 15%) and the A/F is around 22:1.

Accordingly, when performing homogeneous lean combustion in the engine 10, by operating so that the EGR rate is between 10% and 20% (more preferably, the EGR rate is 15%) and the A/F is 22:1, fuel consumption can be improved to the maximum while suppressing the NOx discharge amount to a target amount.

Next, EGR operations in the system of the present embodiment will be described. Although the system of the present embodiment is configured to be capable of performing LPL-EGR through the LPL-EGR passage 38 and HPL-EGR through the HPL-EGR passage 42, LPL-EGR has a characteristic that, in comparison to HPL-EGR, the introduced amount of EGR gas does not easily change with respect to the rotational load of the engine 10. Further, at a time of lean combustion, rich spike control is executed at a predetermined timing. Consequently, stable HPL-EGR cannot be performed in the period when the exhaust gas pressure is disturbed by rich spike control.

Therefore, according to the present embodiment a configuration is adopted in which EGR gas is introduced by LPL-EGR at a time of homogeneous lean combustion. Since it is thereby possible to stably realize a desired EGR rate (for example, 15%), it is possible to reliably suppress the amount of discharged NOx and improve the fuel consumption.

In this connection, although in the above described embodiment there is no particular description regarding a warm-up condition of the engine 10 as a condition for EGR at a time of homogeneous lean combustion, EGR cannot be performed during warm-up when the water temperature is low. This is because condensed water is generated from EGR gas (exhaust gas) before the engine is warmed up, and there is a possibility of the condensed water damaging the compressor 22a and the like. Therefore, in the present embodiment, as a state in which a hazard caused by condensed water is avoided, for example, a fact that the water temperature has reached a temperature of 70° C. or more may be taken as a condition for EGR at a time of homogeneous lean combustion. It is thereby possible to perform EGR while protecting the components of the engine 10.

Further, although in the above described embodiment a configuration is adopted in which the air-fuel ratio is 22:1 and the EGR rate is between 10% and 20% during homogeneous lean combustion, the air-fuel ratio and the EGR rate are not limited to these values. That is, it is sufficient to appropriately set the optimum air-fuel ratio and EGR rate based on the relation between the effect on fuel consumption and the amount of discharged NOx.

Embodiment 2

[Features of Embodiment 2]

Next, Embodiment 2 of the present invention will be described referring to FIG. 11 to FIG. 14. In the system of Embodiment 1 that is described above, by performing EGR at the time of homogeneous lean combustion, knocking is suppressed at a time of a high load and a decrease in the bed temperature of the S/C 32 is suppressed at a time of a low load. Since it is thereby possible to expand an operating region in which lean burn operation is possible to a high-load side and a low-load side, respectively, fuel consumption can be improved while suppressing the amount of discharged NOx.

However, there is a limit to the extent to which the operating region can be expanded. That is, as in the present embodiment, a high-load region that is produced by high supercharging also exists with respect to engine 10 that includes the turbo-supercharger 22. From the viewpoint of securing the torque, lean burn operation in which there is a large amount of air is not suitable for such an operating region. Therefore, in a high-load operating region, stoichiometric burn operation that controls the air-fuel ratio in the vicinity of the theoretical air-fuel ratio is performed. However, as illustrated in the above described FIG. 16, the amount of NOx that is discharged increases when performing stoichiometric burn operation during homogeneous combustion.

Figure 11:
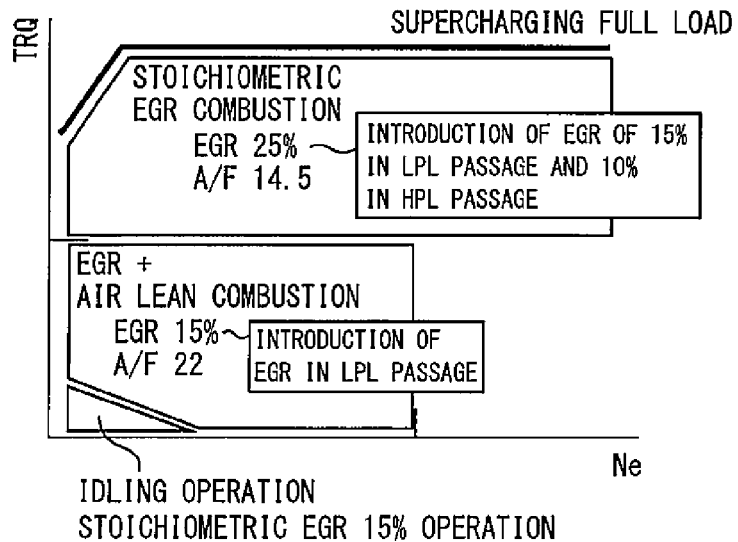
FIG. 11 is a view that illustrates operating regions during homogeneous combustion.

Therefore, according to the present embodiment, a configuration is adopted in which EGR is performed in a high-load, stoichiometric burn operating region. FIG. 11 is a view that illustrates operating regions during homogeneous combustion. As shown in FIG. 11, homogeneous stoichiometric combustion accompanied by EGR is performed in a predetermined high-load region. Note that although a high EGR rate is preferable from the viewpoint of suppressing the NOx discharge amount, if the EGR rate is made 25% or greater, the turbulent burning velocity will become 0 and flame propagation will no longer occur, and hence it is preferable to set the EGR rate to about 25%. It is thereby possible to suppress the amount of discharged NOx while securing the torque at the time of a high load by homogeneous stoichiometric combustion.

Figure 12:
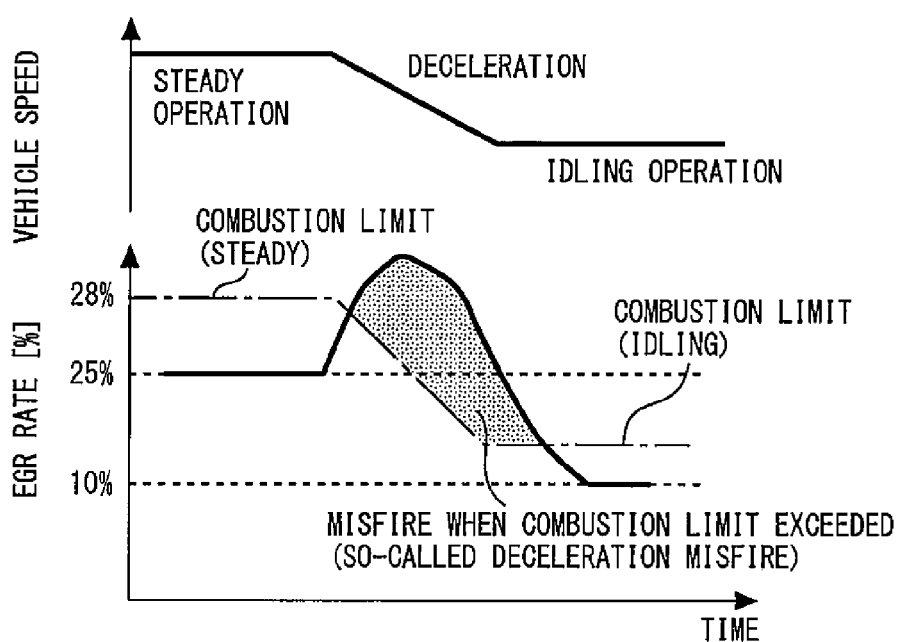
FIG. 12 is a timing chart in a case in which an EGR rate of 25% was attained with HPL-EGR.

Although the system of the present embodiment is configured to be capable of executing LPL-EGR through the LPL-EGR passage 38 and HPL-EGR through the HPL-EGR passage 42, it is difficult to attain an EGR rate of around 25% with only one of the aforementioned kinds of EGR. FIG. 12 is a timing chart in a case in which an EGR rate of 25% was attained with HPL-EGR. In order to introduce a large amount of EGR gas when performing HPL-EGR, it is necessary to provide the EGR passage and the EGR valve with a large diameter, respectively. Consequently, in the case of using this kind of hardware configuration, when a deceleration request is issued as shown in FIG. 12, the response of the EGR valve cannot keep pace with changes in the air amount, and as a result the EGR rate exceeds the combustion limit and misfiring occurs.

Figure 13:
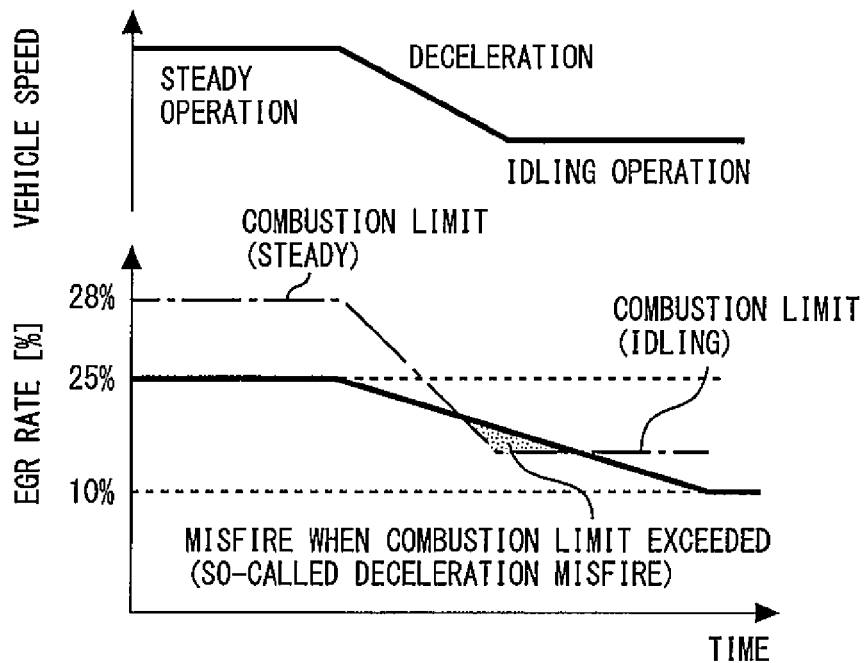
FIG. 13 is a timing chart in a case in which an EGR rate of 25% was attained with LPL-EGR.

On the other hand, FIG. 13 is a timing chart in a case in which an EGR rate of 25% was attained with LPL-EGR. When performing LPL-EGR also, in order to introduce a large amount of EGR gas, similarly to the case of HPL-EGR described above, it is necessary to provide the EGR passage and the EGR valve with a large diameter, respectively. In addition, LPL-EGR has a characteristic that, in comparison to HPL-EGR, the introduced amount of EGR gas does not easily change with respect to the rotational load of the engine 10. Consequently, in the case of using this kind of hardware configuration, when a deceleration request is issued as shown in FIG. 13, the response of the EGR valve cannot keep pace with changes in the rotation speed, and as a result the EGR rate exceeds the combustion limit and misfiring occurs.

Figure 14:
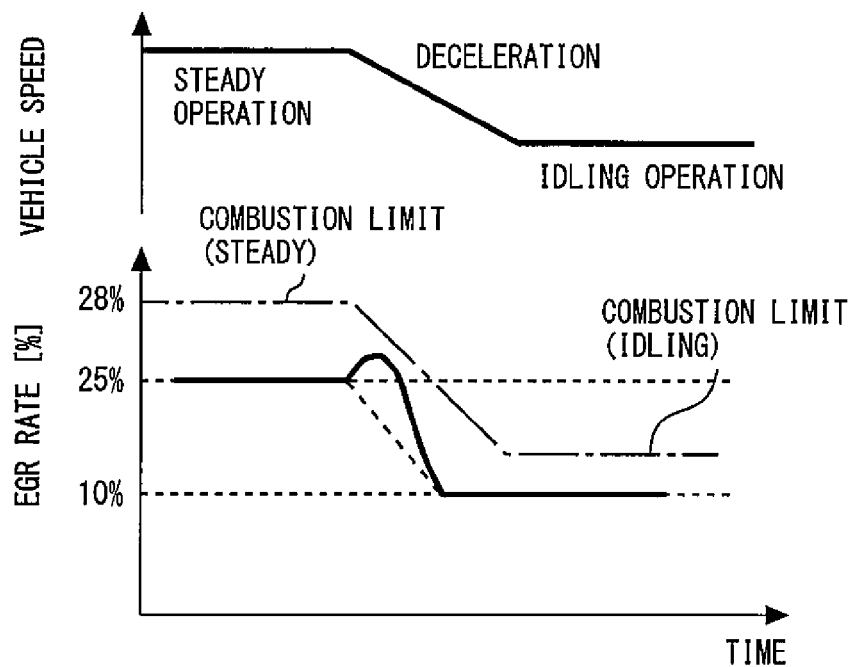
FIG. 14 is a timing chart in the case of combining use of LPL-EGR with an EGR rate of 15% and HPL-EGR with an EGR rate of 10%.

Therefore, according to the present embodiment, a configuration is adopted that combines use of LPL-EGR and HPL-EGR when realizing an EGR rate of 25% during homogeneous stoichiometric combustion. More specifically, a configuration is adopted that realizes an EGR rate of 15% with LPL-EGR and realizes the remaining 10% with HPL-EGR. FIG. 14 is a timing chart in the case of combining use of LPL-EGR with an EGR rate of 15% and HPL-EGR with an EGR rate of 10%. According to this configuration, as shown in FIG. 14, even when a deceleration request is issued, the combustion limit is not exceeded and misfires can be avoided. Note that, with respect to HPL-EGR, it is preferable to adopt a configuration in which the pipe diameter and the valve diameter are as small as possible within a range in which an EGR rate of 10% can be realized. Since the transient responsiveness of the HPL-EGR can be improved thereby, it is possible to effectively suppress the occurrence of misfires.

In this connection, although in the above described embodiment a configuration is adopted in which an EGR rate of 25% is realized during homogeneous stoichiometric combustion, the EGR rate is not limited to that rate. That is, it is sufficient to appropriately set the optimum EGR rate based on the relation between the turbulent burning velocity and the NOx discharge amount. Further, the ratio between the LPL-EGR and the HPL-EGR is not limited to the above described ratio, and it is sufficient to appropriately set the optimum ratio based on the relation with the hardware configuration within a range that does not exceed the combustion limit.

Embodiment 3

[Features of Embodiment 3]

Figure 15:
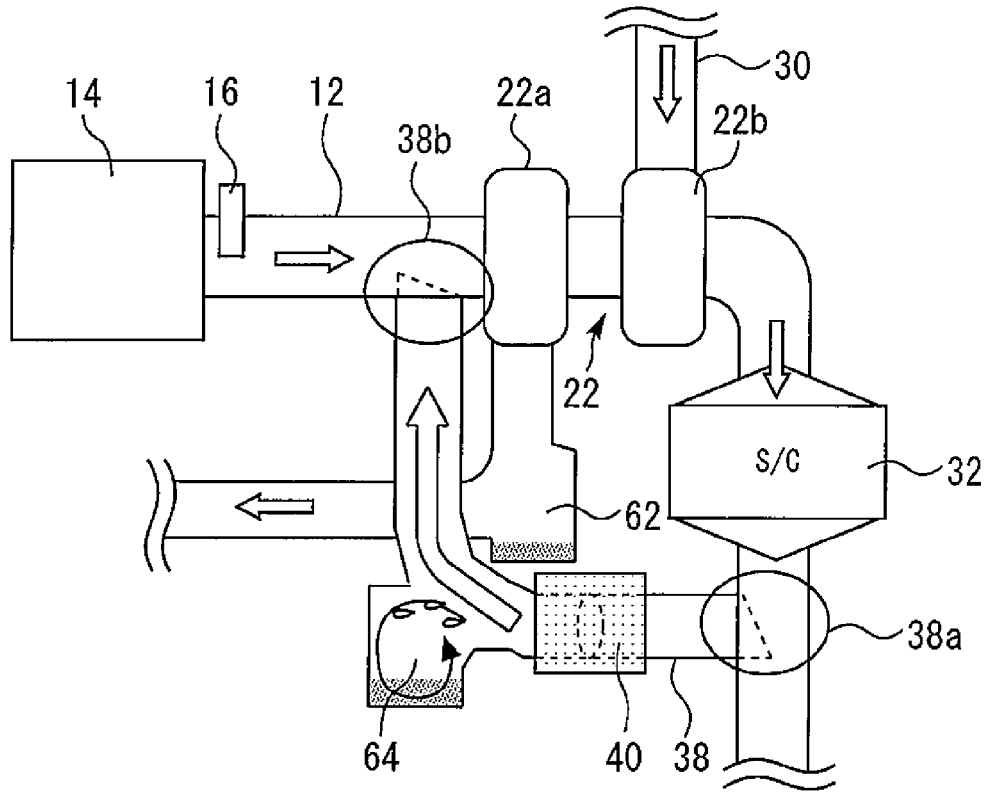
FIG. 15 is a view that illustrates the configuration for the LPL-EGR in detail.

Next, Embodiment 3 of the present invention will be described referring to FIG. 15. FIG. 15 is a view that illustrates the configuration for the LPL-EGR in detail. As shown in FIG. 15, the LPL-EGR passage 38 has a protruding portion 38a that, at a connecting portion with the exhaust passage 30, protrudes into the exhaust passage 30. The protruding portion 38a has a shape in which an end face thereof is cut diagonally so as to open towards an upstream side of the exhaust passage 30, that is, the turbine 22b side. Further, the LPL-EGR passage 38 has a protruding portion 38b that, at a connecting portion with the intake passage 12, protrudes into the intake passage 12. The protruding portion 38b has a shape in which an end face thereof is cut diagonally so as to open towards a downstream side of the intake passage 12, that is, the compressor 22a side. Note that the LPL-EGR passage 38 is configured so that the protruding portion 38b is at a more upward position in the vertical direction than the protruding portion 38a.

Further, accumulation portions 62 and 64 for accumulating condensed water in the respective passages are provided on a downstream side of the compressor 22a in the intake passage 12 and on a downstream side of the LPL-EGR valve 40 in the LPL-EGR passage 38, respectively.

According to this configuration, exhaust gas that flows through the exhaust passage 30 is guided to the LPL-EGR passage 38 by the protruding portion 38a. It is thereby possible to facilitate the introduction of the EGR gas. Further, since the EGR gas that flows through the LPL-EGR passage 38 is introduced from the protruding portion 38b towards the downstream direction of the intake passage 12, it is possible to facilitate the introduction of the EGR gas. In addition, since the protruding portion 38a is positioned on a lower side in the vertical direction relative to the protruding portion 38b, a situation in which condensed water flows to the housing of the compressor 22a can be effectively avoided.

According to the configuration illustrated in FIG. 15, since condensed water inside the LPL-EGR passage 38 is accumulated in the accumulation portion 64, a situation in which condensed water is introduced to the housing of the compressor 22a can be effectively avoided. Further, as shown in FIG. 15, because a discharge port of the compressor 22a is provided on the vertically lower side, condensed water is effectively accumulated in the accumulation portion 62 without the condensed water flowing backward towards the housing of the compressor 22a from the intake passage 12 on the discharge side. It is thus possible to effectively protect the compressor 22a from damage.

DESCRIPTION OF REFERENCE CHARACTERS

10: internal combustion engine (engine)
12: intake passage
22: turbo-supercharger
22a: compressor
22b: turbine
30: exhaust passage
32: start catalyst (SIC)
38: LPL-EGR passage
38a, 38b: protruding portions
40: LPL-EGR valve
42: HPL-EGR passage
46: HPL-EGR valve
60: ECU (electronic control unit)
62, 64: accumulation portions

The invention claimed is:

1. An exhaust circulation apparatus for an internal combustion engine, comprising:
an intake system, wherein the intake system comprises an intake passage and a throttle valve;
an exhaust system, wherein the exhaust system comprises an exhaust passage;
an exhaust gas recirculation (EGR) system, wherein the EGR system comprises a low-pressure loop (LPL) passage and a high-pressure loop (HPL) passage, wherein the LPL passage comprises a LPL valve for regulating exhaust gas flow through the LPL passage to thereby selectively perform EGR, wherein the HPL passage comprises a HPL valve for regulating exhaust gas flow through the HPL passage to thereby selectively perform EGR;
a turbo-supercharger, wherein the turbo-supercharger comprises a compressor fluidly connected to the intake passage and a turbine fluidly connected to the exhaust passage; and
an electronic control unit (ECU), wherein the ECU is connected to the throttle valve, the LPL valve and the HPL valve, wherein the ECU controls the throttle valve, the LPL valve and the HPL valve based on an operating condition of the internal combustion engine to perform homogeneous lean combustion in a predetermined lean-burn region and stoichiometric combustion in which a combustion air-fuel ratio of the internal combustion engine is a theoretical air-fuel ratio in a stoichiometric burn region that is a region on a high-load side relative to the lean-burn region; wherein
the LPL passage recirculates gas that flows through the exhaust passage on a downstream side of the turbine to the intake passage at a position on an upstream side of the compressor,
the HPL passage recirculates gas that flows through the exhaust passage on an upstream side of the turbine to the intake passage at a position on a downstream side of the compressor,
when performing the homogeneous lean combustion, the ECU controls the LPL valve and the HPL valve to cause the LPL passage to perform EGR and the HPL passage to not perform EGR, and
when performing the stoichiometric combustion, the ECU controls the LPL valve and the HPL valve to cause the LPL passage to perform EGR and the HPL passage to perform EGR.

2. The exhaust circulation apparatus according to claim 1, wherein
the LPL valve adjusts an EGR rate of the LPL passage by regulating exhaust gas flow through the LPL passage;
the HPL valve adjusts an EGR rate of the HPL passage by regulating exhaust gas flow through the HPL passage; and
the EGR rate represents a ratio of a gas amount that is recirculated by EGR with respect to a total gas amount that is taken into the internal combustion engine.

3. The exhaust circulation apparatus according to claim 2, wherein when performing the homogeneous lean combustion
an air-fuel ratio is 22:1, the air-fuel ratio being a ratio of fresh air taken in with respect to an in-cylinder fuel amount of the internal combustion engine, and
the EGR rate is between 10% and 20%.

4. The exhaust circulation apparatus according to claim 3, wherein when performing the homogeneous lean combustion
the EGR rate is 15%.

5. The exhaust circulation apparatus according to claim 2, wherein when performing the homogeneous lean combustion
an air-fuel ratio is between 26:1 and 22:1, the air-fuel ratio being a ratio of fresh air taken in with respect to an in-cylinder fuel amount of the internal combustion engine, and
the EGR rate is between 10 %and 20%.

6. The exhaust circulation apparatus according to claim 5, wherein when performing the homogeneous lean combustion
the EGR rate is 15%.

7. The exhaust circulation apparatus according to claim 2, wherein when performing the stoichiometric combustion
the EGR rate is 25%.

8. The exhaust circulation apparatus according to claim 2, wherein when performing the stoichiometric combustion
the EGR rate of the LPL passage is 15%, and
the EGR rate of the HPL passage is 10%.

* * * * *